United States Patent
Austin et al.

(10) Patent No.: US 12,231,498 B2
(45) Date of Patent: Feb. 18, 2025

(54) SYSTEMS AND METHODS FOR ADAPTIVELY COLLAPSIBLE DATA TRANSMISSIONS

(71) Applicant: Vutility, Inc., Sandy, UT (US)

(72) Inventors: Micheal M. Austin, South Jordan, UT (US); Kody Shook Brown, West Jordan, UT (US)

(73) Assignee: Vutility, Inc., Sandy, UT (US)

( * ) Notice: Subject to any disclaimer, the term of this patent is extended or adjusted under 35 U.S.C. 154(b) by 329 days.

(21) Appl. No.: 17/946,984

(22) Filed: Sep. 16, 2022

(65) Prior Publication Data
US 2023/0082986 A1 Mar. 16, 2023

Related U.S. Application Data

(60) Provisional application No. 63/245,124, filed on Sep. 16, 2021.

(51) Int. Cl.
*H04J 3/24* (2006.01)
*H04L 67/12* (2022.01)
*H04L 69/22* (2022.01)

(52) U.S. Cl.
CPC .............. *H04L 67/12* (2013.01); *H04L 69/22* (2013.01)

(58) Field of Classification Search
CPC ......... H04L 67/12; H04L 69/22; H04L 69/06; H04L 2012/5652; H04L 29/0653; H04L 47/10; H04L 29/06; H04Q 11/0478
See application file for complete search history.

(56) References Cited

U.S. PATENT DOCUMENTS

| | | |
|---|---|---|
| 6,711,178 B1 | 3/2004 | O'Gorman et al. |
| 7,583,623 B2 | 9/2009 | Zimmerman et al. |
| 7,586,914 B2 * | 9/2009 | Lansing .................. H04L 69/12 370/392 |
| 8,001,428 B2 | 8/2011 | Ashfield et al. |
| 8,131,877 B2 | 3/2012 | Hutchison et al. |
| 9,065,763 B2 | 6/2015 | Kasztenny et al. |

(Continued)

FOREIGN PATENT DOCUMENTS

| CN | 101854361 | 10/2010 |
|---|---|---|
| CN | 110545313 | 12/2019 |

OTHER PUBLICATIONS

Erkin et al., "Generating Private Recommendations Efficiently Using Homomorphic Encryption and Data Packing", vol. 7, Issue: 3, Jun. 2012, https://ieeexplore.ieee.org/abstract/document/6168832.

*Primary Examiner* — Phuongchau Ba Nguyen
(74) *Attorney, Agent, or Firm* — Foley & Lardner LLP

(57) ABSTRACT

Systems and methods are described for electronically transmitting adaptively collapsible data across a network, whereby a baseline hierarchy of relationships based on precedence is generated for a set of data fields for data generated at an electrical system, and selecting one or more data fields for inclusion in a transmission package based on the hierarchy of relationships and a configurable condition, the configurable condition serving to potentially collapse (or deprecate) a data field, setting a status subfield to indicate inclusion or exclusion of the data field in a payload region of the transmission package and, when a particular data field is to be omitted, including only the status subfield for that data field and omitting the data corresponding to the data field.

20 Claims, 7 Drawing Sheets

(56) References Cited

U.S. PATENT DOCUMENTS

| | | |
|---|---|---|
| 9,237,097 B2 * | 1/2016 | Takasaka .......... G06F 15/17337 |
| 9,497,294 B2 | 11/2016 | Singh et al. |
| 9,531,848 B2 | 12/2016 | Singh et al. |
| 9,531,849 B2 | 12/2016 | Singh et al. |
| 9,635,146 B2 | 4/2017 | Singh et al. |
| 9,652,312 B2 | 5/2017 | Selig et al. |
| 9,654,137 B1 | 5/2017 | Kumaran et al. |
| 9,825,884 B2 | 11/2017 | Hutchison et al. |
| 9,898,834 B2 | 2/2018 | Cai et al. |
| 10,162,700 B2 | 12/2018 | Camp et al. |
| 11,050,859 B2 | 6/2021 | Singh et al. |
| 2004/0015717 A1 * | 1/2004 | Colas .................... H04L 49/901 |
| | | 726/13 |
| 2008/0253373 A1 | 10/2008 | Ros-Giralt et al. |
| 2009/0073981 A1 * | 3/2009 | Coyte ................ H04L 49/9063 |
| | | 370/392 |
| 2014/0173104 A1 * | 6/2014 | Zhou .................. H04L 63/1408 |
| | | 709/224 |
| 2020/0076895 A1 * | 3/2020 | Tsuyunashi ............ H04N 21/40 |

* cited by examiner

| Contents | Bits | Priority |
|---|---|---|
| Msg ID | 8 | 0 |
| $V_A$ | 5 | 1 |
| $V_B$ | 5 | 1 |
| $V_C$ | 5 | 1 |
| $PF_A$ | 6 | 1 |
| $PF_B$ | 6 | 1 |
| $PF_C$ | 6 | 1 |
| Total Ah | 42 | 1 |
| Cap_V | 5 | 1 |
| Reactive_A | 42 | 2 |
| Active_A | 42 | 3 |
| Apparent_A | 42 | 4 |
| $Ah_A$ | 42 | 5 |
| $Ah_B$ | 42 | 6 |
| $Ah_C$ | 42 | 7 |
| $H_A$ | 14 | 8 |
| $H_B$ | 14 | 8 |
| $H_C$ | 14 | 8 |

FIG. 5

SYSTEMS AND METHODS FOR ADAPTIVELY COLLAPSIBLE DATA TRANSMISSIONS

RELATED APPLICATIONS

This application claims priority to U.S. Provisional Application No. 63/245,124, entitled COLLAPSIBLE ADAPTIVE DATA PACKING, filed Sep. 16, 2021, which is incorporated herein by reference in its entirety.

TECHNICAL FIELD

The present disclosure is generally directed to data compression, and more particularly to collapsible adaptive data packing for transmitting small data packets wirelessly.

BACKGROUND

Wireless communication protocols (or applications employing such protocols) can impose stringent packet size, message size, or both. The stringent packet/message size requirements may serve to conserve power; to conform to bandwidth constraints; to accommodate sharing gateway connections with other—perhaps hundreds—of devices (such as in an Internet-of-Things (IoT) setting), conform to device complexity (or simplicity), etc. In other instances.

One such environment is a long-range IOT wide-area network (or LoRaWAN). A LoRaWAN can adjust data rates and spreading factors automatically (called ADR) to allow more devices to connect to LoRaWAN Gateways. When ADR occurs, packet sizes can be reduced to as few as eleven bytes. A similar wireless technology, Sigfox public IoT network (more often seen in Europe, South Africa, Australia and New Zealand), provides low cost wireless network connectivity by, among other things, employing stringent message size constraints which limit message size to twelve bytes of payload data per message. The availability of Sigfox networks and the low cost to use a Sigfox network provide an excellent communication platform for IoT technology. Nevertheless, twelve bytes of data per message is extremely small.

SUMMARY

The present disclosure is directed to data compression that may have particular utility in IoT applications to transmit a limited data packet wirelessly in an efficient or low power manner. Methods and systems are described that implement collapsible-adaptive data (or bit) packing for transmitting data using small data packets wirelessly.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments and are, therefore, not be considered limiting of the scope of the disclosure, the embodiments will be described and explained with specificity and detail in reference to the following accompanying drawings.

FIG. 5 illustrates a baseline priority table, such as may be used to establish baseline or current-instance priorities at an ACDTS, according to an embodiment of the present disclosure.

DETAILED DESCRIPTION OF PREFERRED EMBODIMENTS

Figure 1:
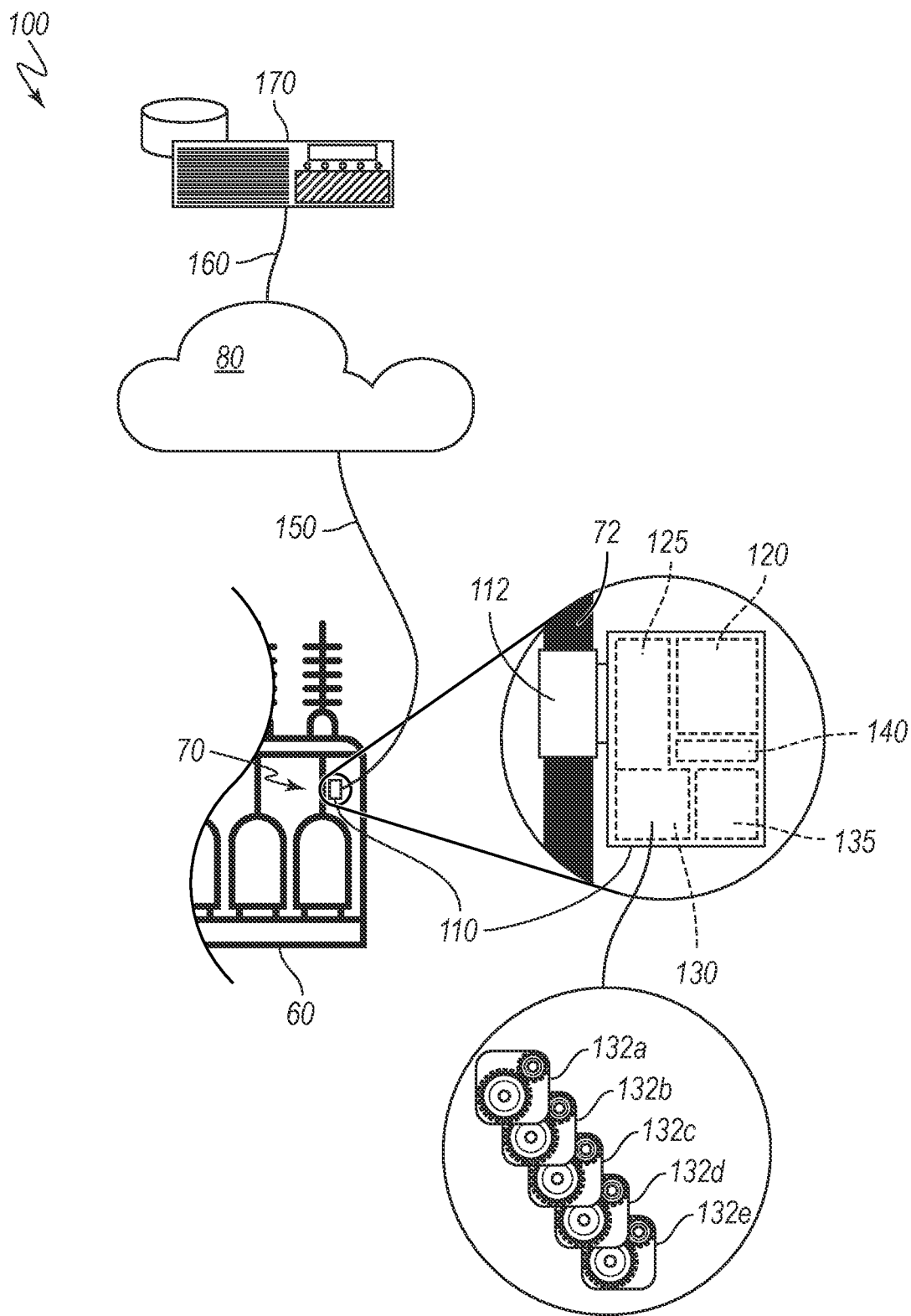
FIG. 1 is a system architecture diagram an adaptively collapsible data transmission system (ACDTS), according to an embodiment of the present disclosure.

As is well-known, some IoT wireless communication applications operate with stringent packet or message size requirements. As an example of such a wireless communication application, the LoRaWAN operates in the Federal Communications Commission (FCC) Freedom to Operate (FTO) Frequencies and can adjust data rates and spreading factors automatically (using automated device recognition, or ADR) to allow more devices to connect to LoRaWAN Gateways. ADR can impose packet size restrictions. For example, packet size may be limited to as few as eleven bytes (or 88 bits) of payload data. The Sigfox public IoT network provides wireless network connectivity for essentially a fraction of a (US) cent per transmission (or data packet), in part, by imposing stringent size constraints on messages, and by limiting a total number of transmissions per time period (e.g., per day, etc.). Sigfox limits messages to twelve bytes of data per message, and to, e.g., no more than 100 messages per day. The availability of Sigfox and the low cost to use the network provides an excellent communication platform for IoT technology; however, twelve bytes of data is extremely small.

Presently, technologies exist which seek to mitigate the limitations of size constraints and number of messages per period; however, each such mitigation effort has shortcomings which the present invention overcomes, such as, e.g., time synchronization, time-sensitive (perishable) data/datasets, etc.

The present disclosure provides methods and systems to prioritize and adaptively collapse data of discrete messages whereby an increased variety of data per message, as well as across multiple messages, is achieved within the constraints of small or otherwise minimal-sized data packet conductions, such as IoT networks. Adaptive collapse of data is achieved in response to a priority and utility of each dataset of the datasets currently available for inclusion in a message to be wirelessly transmitted, with the priority and/or utility in some instances related to an analogous payload of a prior message.

As used herein, the term "datatype" refers to classification of a datum such that the value of the datum itself is related to a defined/definable characteristic. By way of example "12" is a value of a datum without particular significance except for its association to a datatype, such as, e.g., "inches," "delay seconds." "volts DC," etc. A datatype may define the type of the datum, e.g., binary, ASCII, hexadecimal, text, number, etc. A datatype may further define a size, a value, a value range, etc., for the associated datum, either inherently or explicitly. The terms "datatype" and "data field" may be used interchangeably.

As used herein, the term "data field" refers to a container for a datum. The container that is the data field may define the type of the datum, e.g., binary, ASCII, hexadecimal, text, number, etc. A data field may further define a size, a value, a value range, etc. for the associated datum, either inherently or explicitly. The terms "data field" and "datatype" may be used interchangeably.

FIG. 1 is a system architecture diagram of an adaptively collapsible data transmission system (ACDTS) 100, according to an embodiment of the present disclosure. The ACDTS 100 comprises a node 110 coupled to a monitored system 60 and communicatively coupled 150, 160 via a cloud network 80 to a gateway device 170. The monitored system 60 is depicted as an electric grid component; however, this is for convenience of the disclosure and not by way of limitation, as the disclosure anticipates the monitored system 60 may be any device, plurality of devices, installation, system, etc., whether electrical, mechanical, or both, which may lend itself to monitoring, such as via an IoT node. The node 110 comprises at least a capability to monitor the monitored system 60. The node 110 comprises a coupling 112 that electrically and/or mechanically couples 70 to a feature 72 of the monitored system 60. The node 110 further comprises a one or more processors 120, an electronic memory 125, 130, a network interface 135, and a bus 140. The electronic memory 125 comprises a non-volatile memory 130. The network interface 135 may communicate 150 with a cloud network 80 to communicate 160 with a gateway device 170 (e.g., an IoT gateway device). The bus 140 represents the functionalities of a system bus and an input/output (I/O) interface, which functionalities may be operated at disparate components of the node 110, or may consolidated (potentially including other functionality) to a unified component of the node 110.

The one or more processors 120 may include one or more general purpose devices, such as an Intel®, AMD®, or other standard microprocessor. The one or more processors 120 may include a special purpose processing device, such as ASIC, SoC, SiP, FPGA, PAL, FPLA, PLD, or other customized of programmable device. The one or more processors 120 may perform distributed (e.g., parallel) processing to execute or otherwise implement functionalities of the present embodiments. The one or more processors 120 may run a standard operating system and perform standard operating system functions. It is recognized that any standard operating systems may be used, such as, for example, Microsoft® Windows®, Apple® MacOS®, Disk Operating System (DOS), UNIX®, IRJX, Solaris®, SunOS®, FreeBSD®, Linux™, ffiM® OS/2® operating systems, and so forth. The one or more processors 120 may run an operating system particularly configured to facilitate the node 110 monitoring the monitored system 60. The processor 120 may be configured to operate program modules 132a-132e whereby the processor 120 receives a current dataset including data for a plurality of data fields and data for each data field reflecting or representing a measurement of performance or a characteristic of the electrical system, including to generate a transmission package by determining, for each given data field in sequential order or sequence according to prioritization, whether the data of the given data field is appropriate for reporting to a receiver (e.g., a gateway device) or otherwise to be included in the transmission package, based on a configurable condition. If the data of the given field is to be included in the transmission package, setting a status subfield (e.g., a bit) to indicate inclusion of the data of the given data field and adding the status subfield and the data of the given data field to the transmission package. If the data of the given data field is to be excluded or omitted from the transmission package, setting the status subfield (e.g., a bit) to indicate exclusion or omission of the data of the given data field and adding only the status subfield in the transmission package and thereby omitting the data and the remaining portion of the given data field.

The electronic memory 125 may include static RAM, dynamic RAM, flash memory, one or more flips-flops, ROM, CD-ROM, DVD, disk, tape, or magnetic, optical, or other computer storage medium. The electronic memory 125 may include a plurality of program modules 132a-132e.

The program modules 132a-132e may include or relate to all or portions of other elements of the ACDTS 100. The program modules 132a-132e may run multiple operations concurrently or in parallel by or on the one or more processors 120. In some embodiments, portions of the disclosed modules, components, and/or facilities are embodied as executable instructions embodied in hardware or in firmware, or stored on a non-transitory, machine-readable storage medium. The instructions may comprise computer program code that, when executed by a processor, a GPS, and/or computing device, cause a computing system to implement certain processing steps, procedures, and/or operations, as disclosed herein. The modules, components, and/or facilities disclosed herein, may be implemented and/ or embodied as a driver, a library, an interface, an API, FPGA configuration data, firmware (e.g., stored on a ROM, an EPROM, an EEPROM, etc.), and/or the like. In some embodiments, portions of the disclosed modules, components, and/or facilities are embodied as machine components, such as general and/or application-specific devices, including, but not limited to: circuCWAS, integrated circuCWAS, processing components, interface components, hardware controller(s), storage controller(s), programmable hardware, FPGAs, ASICs, and/or the like.

The program module 132a may comprise executable instructions which, when executed, operate a hierarchy management engine 132a of the ACDTS 100, whereby the ACDTS 100 generates, acquires, or otherwise receives, and implements a prioritization hierarchy relative to data reflecting a performance or characteristic of the monitored system 60. The hierarchy management engine 132a comprises or acquires identifiers of data fields or datatypes (data fields) which may be used to contain or reference particular data reflecting a performance or characteristic of the monitored device 50. The hierarchy management engine 132a may establish a precedence (or priority) of communicating the data of each such data field to the gateway device 170. The hierarchy management engine 132a may generate a hierarchical relationship for each datatype (data field) of a collection of datatypes (data fields) to at least one other datatype (data field) of the collection. The hierarchical relationship may be based on a precedence of each datatype (data field). Of a collection of data that may be generated or acquired by the node 110, some data is of higher importance relative to other data of the collection. The importance of communicating contents of a particular data field of the collection of data fields may be attenuated or enhanced based on a number of configurable conditions. By way of nonlimiting examples, a configurable condition may be a degree of change between a measurement of performance reflected or represented by a current datatype and a measurement of performance reflected or represented by a previous instance of the current datatype included in a prior collection of datatypes. A configurable condition may be a recency or transmission of at least one prior datatype reflecting or representing a measurement of the same performance and a prior datatype reflecting or representing another measurement of performance. A configurable condition may relate to an event, such as an outage, a restart, a performance spike or lull, etc., at the electrical system. A configurable condition may relate to a time-based schedule (e.g., a mandated periodicity of reporting a particular datatype, etc.). In other words, a configurable condition may comprise multiple factors, such as, e.g., a change (or lack of change) in value for the data field from a previous generation or acquisition of data, an interval of time since the last communication of the contents of the particular data field, a lapse of time regardless of communication interval of the contents of the particular data field, an event at the node 110 or monitored system 60, etc. The hierarchy management engine 132a establishes a priority order based on the relative importance of communicating each data field and each relevant configurable condition. The priority order and configurable conditions may be stored at the electronic memory 125 in an appropriate format (e.g., a database table, an array, etc.) as a priority configuration. In other words, the hierarchical relationship of a datatype (data field) may be adjustable based on a configurable condition. One datatype (data field) has a highest precedence relative to other datatype (data fields).

The program module 132b may comprise executable instructions which, when executed operate an interrogation engine 132b of the ACDTS 100, whereby the ACDTS 100 generates, acquires, or otherwise receives data reflecting a performance (or measurement thereof) or characteristic of the monitored system 60. The data generated or acquired via the interrogation engine 132b. The interrogation engine 132b periodically acquires or receives data for the collection of datatypes or data fields corresponding to the hierarchical relationships. Each datatype reflects or represents a measurement of performance or a characteristic of a system, such as an electrical system. The interrogation engine 132b may enable the one or more processors 120 to interrogate one or more sensors associated to the node 110 or to the monitored system 60. The interrogation engine 132b may enable the one or more processors 120 to employ another program module, API, etc., to generate data reflecting a performance or characteristic of the monitored system 60. The data generated or acquired may, more particularly reflect a measurement of a performance or characteristic of the monitored system 60, a component, a subsystem, or other division of the monitored system 60. The interrogation engine 132b may periodically generate or acquire a plurality of data, each reflecting a disparate performance or characteristic, or disparate aspect of a performance or characteristic of the monitored system 60. The interrogation engine 132b may further order, or otherwise relate each datum to the particular performance, characteristic, measurement, etc. By way of nonlimiting example, the interrogation engine 132b may acquire an instantaneous voltage for each line of a three-phase circuit, an amperage, a power factor for each line of the three-phase circuit, an ambient air temperature, a temperature of a component, a speed (RPM) of a motor, etc. Each of these data is, essentially a number having a designed precision. The interrogation engine 132b may generate or acquire each numeric value and associate each numeric value to a field or other identifier where each numeric value is identifiable to the particular aspect resulting in generation of the numeric value. Simply stated, the interrogation engine 132b may associate, e.g., "230.678" to "volts at line A" of the three-phase circuit, etc. The interrogation engine 132b may further enable the one or more processors 120 to store, at the electronic memory 125, the collection of data generated or acquired in its associated form, along with a timestamp, a serial identifier, or other signifier placing the particular collection of data in a series of preceding (and succeeding) collection of data similarly generated or acquired at different times. In one embodiment, some of the functions of the interrogation engine 132b may performed by instructions of another program module 132a, 132c-132e.

The program module 132c may comprise executable instructions which, when executed operate a prioritization engine 132c of the ACDTS 100, whereby the ACDTS 100 analyzes each datum of the collection of data generated or acquired by the interrogation engine 132b based on the priority configuration generated or acquired by the hierarchy management engine 132a. The prioritization engine 132c identifies a first data field, the contents of which are deemed as a baseline to be of the highest priority to be communicated to the gateway device 170 and applies each relevant configurable condition to determine if the priority of the current instance of data retains the highest priority or is to be collapsed (or deprecated). The prioritization engine 132c assigns a flag bit to the data field indicating whether or not the data field is collapsed for the current instance of data generation or acquisition. For example, the priority configuration may indicate that if the baseline-highest priority data field for the current instance contains a value unchanged from the previous communication of the data field to the gateway device 170 and that value falls within a defined value range, the current data field is collapsed, and the flag bit is set to "0," otherwise, the flag bit is set 1. Prioritization of data fields may comprise a change of value of a given data field from a value of the given data field of an earlier transmission. The data value for each data field is examined in view of its baseline priority and each relevant configurable condition such that all data fields for the current collection of generated or acquired data has an associated flag bit to indicate collapse/non-collapsen. Said otherwise, a datatype is selected from the current collection of datatypes that is currently appropriate for reporting to a receiver (such as, e.g., the gateway device 170) based on the hierarchical relationships and the configurable condition.

The program module 132d may comprise executable instructions which, when executed operate a compilation engine 132d of the ACDTS 100, whereby the ACDTS 100 compiles a transmission package. In one embodiment, the compilation engine 132d receives each flag bit from the prioritization engine 132c and each data value from the interrogation engine 132b. In one embodiment, the compilation engine 132d the data values and flag bits are received from the prioritization engine 132c. The transmission package comprises a payload region. That is, the compilation engine 132d formats a transmission package comprising a data payload region. The payload region may be capable of including multiple datatypes of the collection of datatypes. The payload region may have a defined size constraint, e.g., eleven bytes, twelve bytes, etc. In an IoT setting, formatting the transmission package comprises imposing a transmission size constraint that precludes the transmission package containing all datatypes (data fields) of the collection of datatypes. The compilation engine 132d inserts at the first bit of the payload region the flag bit for that data field having the highest baseline priority (unaffected by configurable conditions). The first bit of compiled payload region serves as a flag bit to indicate a presence or absence of the highest precedence datatype in the immediately subsequent bits of the payload region. If that flag bit is set to "1" (non-collapsed), the compilation engine 132d next inserts the data value for that data field. If that flag bit is set to "0" (collapsed), the compilation engine 132d inserts the flag bit for the next highest baseline priority data field at the second bit of the payload region. If that flag bit is set to "1" (non-collapsed), the compilation engine 132d inserts the data value for that data field. If that flag bit is set to "0" (collapsed), the compilation engine 132d inserts the data value for the third-highest baseline priority data field, and so forth until the payload region can contain no further data fields or all non-collapsed data fields have been inserted into the payload region. A succeeding bit, relative to the first bit of the payload region, serves as a flag bit to indicate presence or absence of a next highest precedence datatype in bits immediately subsequent to that succeeding bit, and the data value for the particular datatype is included in bits of the payload region immediately subsequent to the succeeding bit. In one embodiment, the flag bit values may be inverted, whereby a "0" indicates non-collapsed and "1" indicates collapsed. The compilation engine 132d may further prepend and append any other data necessary to prepare the transmission package for communication to the gateway device 60. Each of the hierarchy management engine 132a, the interrogation engine 132b, the prioritization engine 132c, and the compilation engine 132d (as well as other engines that may be likewise operating) may insert appropriate entries into the electronic memory 125 for recordkeeping and future reference.

The electronic memory 125 may include data, for example stored program data, generated by the ACDTS 100, such as by the program modules 132a-132e or other modules. The stored program data may be organized as one or more data structures, data streams, etc. The electronic memory 125 may be configured to store, in particular, the hierarchical relationships. In other words, the electronic memory 125 stores a prioritization (hierarchical relationships) of data fields of a plurality of data fields to be included within a dataset.

The bus 140 may facilitate interfacing with one or more input devices and/or one or more output devices. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or hardware.

The network interface 135 may facilitate communication with other computing devices and/or networks 80, such as the Internet and/or other computing and/or communication networks. In particular, the network interface 135 provides means to transmit the transmission package to a receiver (e.g., the gateway device 170). The network interface 135 may be equipped with conventional network connectivity, such as, for example, Ethernet (IEEE 802.3), Token Ring (IEEE 802.5), Fiber Distributed Datalink Interface (FDDI), or Asynchronous Transfer Mode (ATM), etc. The network interface 135 may be configured with purpose-built network connectivity, such as lightweight transport protocols (e.g., LoRaWAN, Sigfox, etc.). Further, the node 110 may be configured to support a variety of network protocols, such as, for example, Internet Protocol (IP), Transmission Control Protocol (TCP), Network File System over UDP/TCP, Server Message Block (SMB), Microsoft® Common Internet File System (CIFS), Hypertext Transfer Protocols (HTTP), Secure HTTP (SHTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), Secure Reliable Transport (SRT) protocols, Reliable Internet Stream Transport (RIST) protocols, and so forth.

The bus 140 may facilitate communication and/or interaction between the other components of the ACDTS 100, including the one or more processors 120, the electronic memory 125, and the network interface 135.

The processor 120 is configurable to enable the processor 120 to read and execute computer-executable instructions, such as computer-executable instructions to perform the methods describe herein. The computer-executable instructions may be stored in the memory 125, or in another memory accessible to the processor 120. The bus 140 may enable the processor 120 to communicate with the memory 125 and/or another memory, a gateway device, a peer node, a supervising node, a subordinate node, etc. The electronic memory 125 may store computer-readable and executable instructions to enable the processor 120 to perform the methods described herein.

The network interface 135 may enable communication of the transmission package to cloud network 80 and/or the gateway device 170

Furthermore, the described features, operations, or characteristics may be arranged and designed in a wide variety of different configurations and/or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Descriptions is for illustrative purposes only and is not meant to imply a required order, unless specified to require an order.

Embodiments may include various steps, which may be embodied in machine-executable instructions to be executed by a general-purpose or special-purpose computer (or other electronic device). Alternatively, the steps may be performed by hardware components that include specific logic for performing the steps, or by a combination of hardware, software, and/or firmware.

Embodiments may also be provided as a computer program product including a computer-readable storage medium having stored instructions thereon that may be used to program a computer (or other electronic device) to perform processes described herein. The computer-readable storage medium comprises at a non-transient storage medium, and may include, but is not limited to a hard drive, a fixed disk, a removable disk, a floppy diskette, an optical disk, a CD-ROM, a CD-RW, a DVD-ROM, a DVD-RW, a read-only memory (ROM), a random access memory (RAM), an erasable programmable ROM (EPROM), an electrically erasable programmable ROM (EEPROM), a magnetic card, an optical car, a solid-state memory device, or other types of media/machine-readable media suitable for storing electronic instructions.

A program module, module, or component may include any type of computer instruction or computer executable code located within hardware, a memory device and/or computer-readable storage medium and may be implemented in or by software and/or hardware elements.

Figure 2:
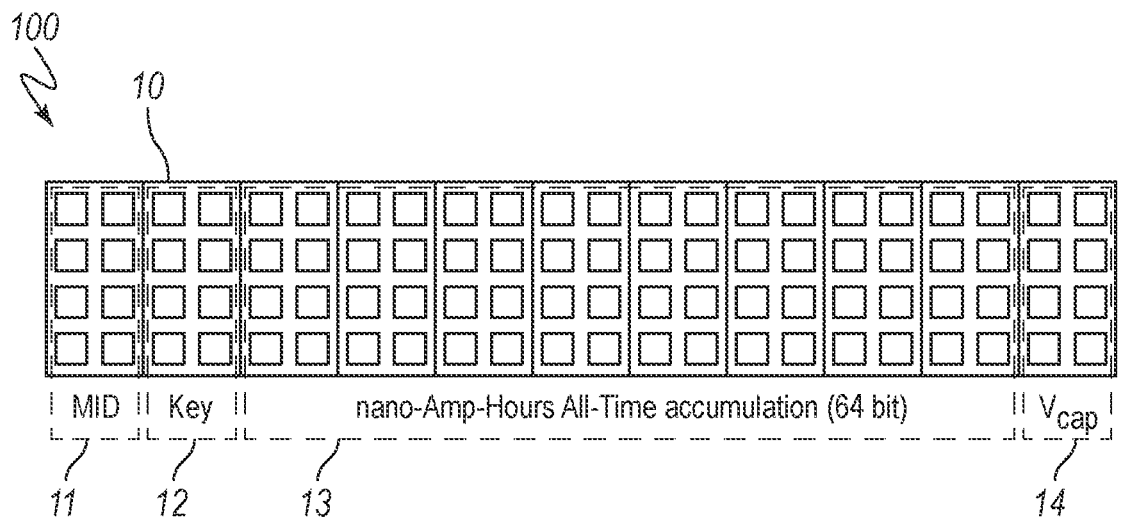
FIG. 2 is a representation of a typical message payload region in data transmission environment.

FIG. 2 is a representation of a message payload region 10 in an Internet-of-Things (IoT) environment 1 according to a prior art embodiment. In the example of FIG. 2, the payload region 10 is part of a message generated at an IoT end-node, sensor, origination device. In other words, the message may be generated at an electrical energy monitoring device (e.g. a VUTILITY™ HotDrop™, VoltDrop™) or another IoT client device. The message bearing the payload region 10 is to be transmitted to an IoT Gateway. The payload region 10 comprises a message identifier (message ID) 11 comprising eight bits, a key 12 comprising eight bits, a first data 13 comprising 64 bits, and a second data 14 comprising eight bits. The key 12 may be a firmware version, and encryption key, or other relevant datum. The first data 13 comprises a 64-bit binary representation of a nano-Amp-Hours All Time accumulation. The second data 14 comprises an 8-bit representation of a capacitor voltage. Because the message follows a prescribed a format, messages from different IoT devices can arrive at an IoT Gateway and be timestamped and employed to develop systemic data, such as, e.g., Total kilowatt-hours for the system.

The payload region 10 may be usefully analogized (without imposition of limitation) to a passenger train service. A passenger train service may comprise a number of passenger trains of a particular capacity dispatched from a plurality of locations (origins) to a common destination according to a schedule at particular intervals. The train may be the message. More particularly, the train and the cars of the train can be analogous to the message. Each train comprises eleven cars with each car analogous to a byte of data, hence, eight bits (passengers) per car. Each train has 88 seats (bits). Any party (group of travelers, analogous to a datum from the origination device) may require more than one seat (multiple bits). According to the prior art, an origination device may encode, at best, Amp-hours data requiring 88 bits (11 bytes), or the whole train.

Figure 3:
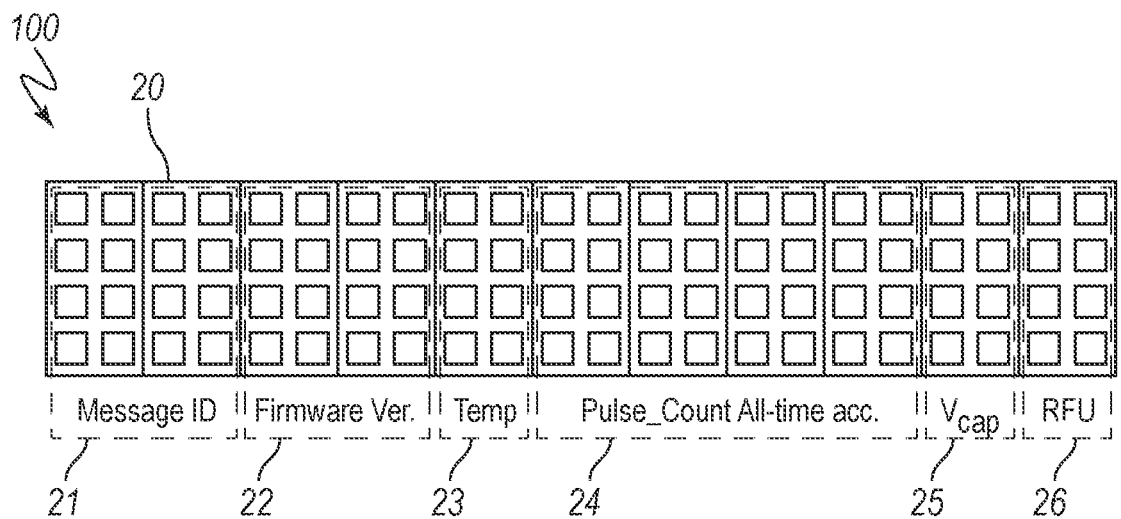
FIG. 3 is a representation of another message payload region in a data transmission environment.

FIG. 3 is a representation of another message payload region 20 in an Internet-of-Things (IoT) environment 1 according to a prior art embodiment. The message of FIG. 3 may be generated at an IoT origination device capable of counting pulses of an electrical energy system or device (e.g., a VUTILITY™ PulseDrop™, etc.). The payload region 20 comprises a 16-bit message ID 21, a 16-bit key 22, a first datum 23 having eight bits, a second datum 24 having 32 bits, a third datum 25 having eight bits, and a fourth datum 26 having eight bits. The first datum 23 may be a chip temperature. The second datum 24 may be a Pulse Count All-time accumulation. The third datum 25 may be capacitor voltage. The fourth datum 26 may be reserved for future use (RFU). The passenger train analogy of FIG. 2 is similarly applicable here, as each message containing the payload region 20 follows a prescriptive format and schedule.

Figure 4:
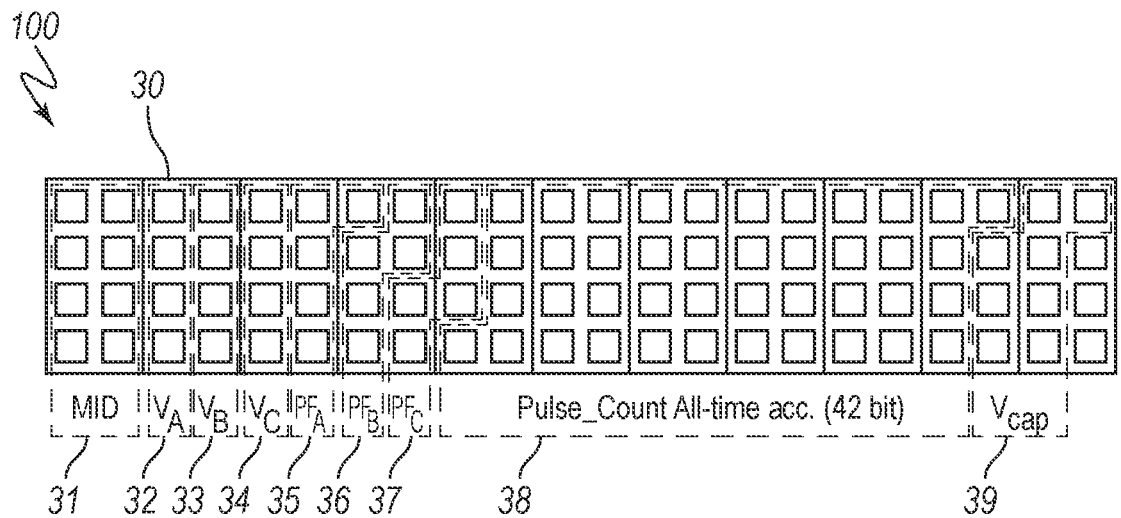
FIG. 4 is a representation of another message payload region in a data transmission environment.

FIG. 4 is a representation of another message payload region 30 in an Internet-of-Things (IoT) environment 1 according to a prior art embodiment. The message of FIG. 4 may be generated at an IoT origination device capable of detecting voltage on a monitored conductor (e.g., a VUTILITY™ VoltDrop™, etc.). The payload region 30 comprises an 8-bit message ID 31; a first datum 32, a second datum 33, and a third datum 34, each having four bits; a fourth datum 35, a fifth datum 36, and a sixth datum 37, each having five bits; a seventh datum 38 having 42 bits, and an eighth datum 39 having eight bits. The first datum 32, second datum 33, and third datum 34 may each, respectively, represent a voltage at a first, second, and third line of a three-phase electrical circuit. The fourth datum 35, fifth datum 36, and sixth datum 37 may each, respectively, represent a power factor at the first, second, and third line of the three-phase electrical circuit. The seventh datum 38 may represent a Pulse Count All-time accumulation. The eighth datum 39 may represent a capacitor voltage. The passenger train analogy of FIG. 2 is similarly applicable here, as each message containing the payload region 30 follows a prescriptive format and schedule.

Referring to FIGS. 2-4 collectively, three data packages (or messages—e.g., trains) are needed to provide data for the entire varied set of data fields. The embodiments of the present disclosure provide adaptable collapsible data packing that can reduce the number of packages. Data fields that remain unchanged from one sampling to another can be collapsed to be represented as valid, but unchanged readings, by utilizing only 1 bit. For example, one packet can be used to for a majority of transmissions to communicate the entire varied set of data fields.

FIG. 5 illustrates a baseline priority table 505, such as may be used to establish baseline or current-instance priorities at an ACDTS 500, according to an embodiment of the present disclosure. The baseline priority table 505 can include at least a contents column 506, a size (in bits) column 507, and a baseline priority column 508. A collection of data fields 510-595 is shown in the contents column 506. A collection data field sizes 510a-595a (shown in bits) for the respective data fields 510-595 is shown in the size column 507. A collection of baseline priorities 510b-595B corresponding to each respective data field 510-595 is shown in the baseline priority column 508. In the example of FIG. 5, a message ID 510 is shown with a size of eight bits 510a, and a priority of 0 510b. The 0 priority 510b indicates the message ID 510 cannot be collapsed and is included in every transmission package. Following the message ID 510 in the contents column 506 is a series of data fields 515-550 each having a 1 priority 515b-550b. The 1 priority indicates each of the associated fields is included in a transmission package unless collapsed. The plurality of data fields 515-550 may have the same priority because the payload region of the transmission package is able to accommodate all of these data fields in each transmission (when not collapsed), or because some or each of these particular data fields may be mutually exclusive. When same-priority data fields are mutually exclusive, one or more of the mutually-exclusive data fields will be collapsed in each instance of data generation or acquisition, hence, the total number of bits actually used in a particular payload package is less than the sum of same-priority mutually-exclusive data fields in the baseline priority table 505. Furthermore, each non-collapsed data field is included in the payload region for the current generation or acquisition of data in priority order. When a size constraint limits the size of the payload region, and when a lower priority data field does not fit in the payload region after non-collapsed higher priority data fields have been included, each non-collapsed lower priority data field is automatically collapsed. The ACDTS 100 records the status (collapsed/non-collapsed) of each data field for each transmission package, whereby the ACDTS 100 is able to adjust a priority for a data field when the data field has not been included for a particular period of time (or has been included a particular number of times over a period of time, etc.)

Figure 6A:
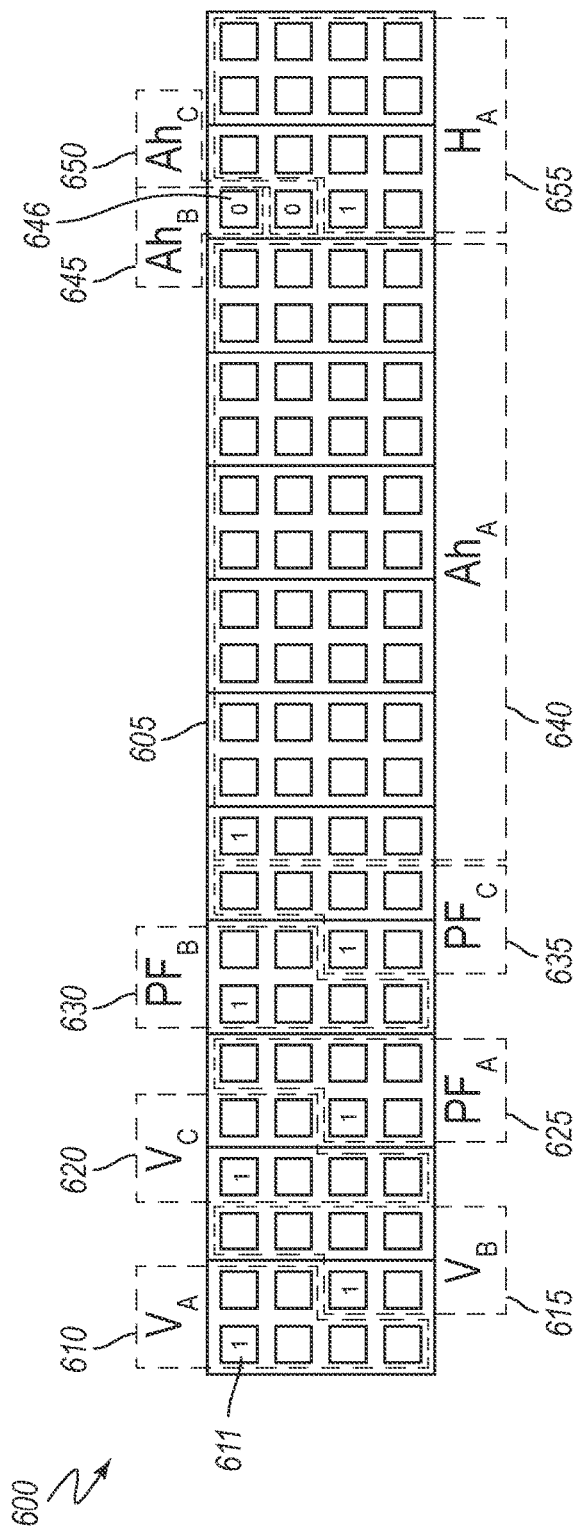
FIG. 6A illustrates a payload region of a transmission package compiled by an ACDTS, according to an embodiment of the present disclosure.

FIG. 6A illustrates a payload region 605 of a transmission package compiled by an ACDTS 600, according to an embodiment of the present disclosure. The ACDTS 600 may be similar to the ACDTS 100 of FIG. 1. The payload region 605 of FIG. 6A is limited to twelve bytes. The contents of the payload region 605 is based on a baseline priority table (similar in some respects to the baseline priority table 505 of FIG. 5) with configurable conditions applied whereby some data fields are omitted or collapsed, resulting in a collapsed data payload. In the example of FIG. 6A, the voltage for the first phase (line A) of a three-phase circuit data field 610 is not collapsed, as indicated by the flag bit 611 set to "1." The succeeding bits contain a representation of a numeric value corresponding to a voltage at line A ($V_A$). Similarly, values are included for the non-collapsed data fields voltage (second phase, or line B) ($V_B$) 615, $V_C$ 620, power factor at line A ($PF_A$) 625, $PF_B$ 630, $PF_C$ 635, and Amp-hours for line A ($Ah_A$) 640. Following the $Ah_A$ 640, a collapsed data field for $Ah_B$ 645 is shown having a flag bit 646 set to "0" to indicate the data field is collapsed such that only the flag bit 646 is included in the payload region 605. The data field $Ah_C$ 650 is also collapsed. In the present example, the data fields $Ah_B$ and $Ah_C$ 645, 650 are collapsed because the payload region 605 does not have room for them, regardless of collapse state. The data field harmonic for the first phase ($H_A$) 655 is not collapsed and space remains in the payload region 605 to accommodate this data field, so it is included. Any other data fields of lower priority are collapsed due to lack of space in the payload region 605 (similar to collapse of the $Ah_B$ and $Ah_C$ data fields 645, 646).

Figure 6B:
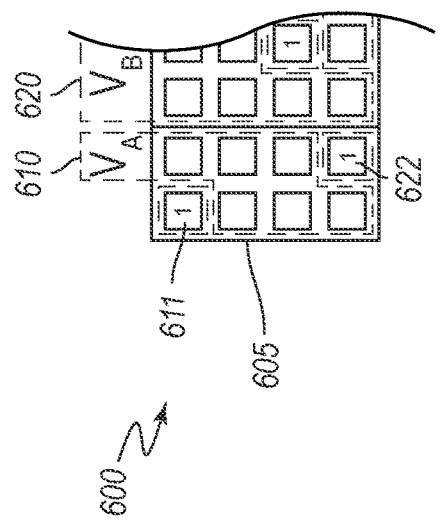
FIG. 6B illustrates the payload region of a transmission package compiled by the ACDTS of FIG. 6A, according to another embodiment of the present disclosure.

FIG. 6B illustrates the payload region 605 of a transmission package compiled by the ACDTS 600 of FIG. 6A, according to another embodiment of the present disclosure. In the embodiment of FIG. 6A, each flag bit (flag bits 611 and 646, related to the respective data fields $V_A$ 610 and $Ah_B$ 645, are identified for reference in FIG. 6A) are shown inside the respective data field. In such an embodiment, where appropriate, the first bit (the flag bit) is ignored as relates to the data value of the data field, or the data value is interpolated (the "1" may be cast to a "0" when the system determines the data value meets an appropriate criterion). In FIG. 6B, two flag bits 611, 621 are identified. In the embodiment of FIG. 6B, the flag bits 611, 621, et seq., are not included in the data field (and, hence, not in the data value). The flag bits 611, 621, 646, etc., serve as a status subfield, whether rendered as shown in FIG. 6A or as shown in FIG. 6B. In one embodiment, the status subfield 611, 621 may have a size other than one bit.

Figure 7:
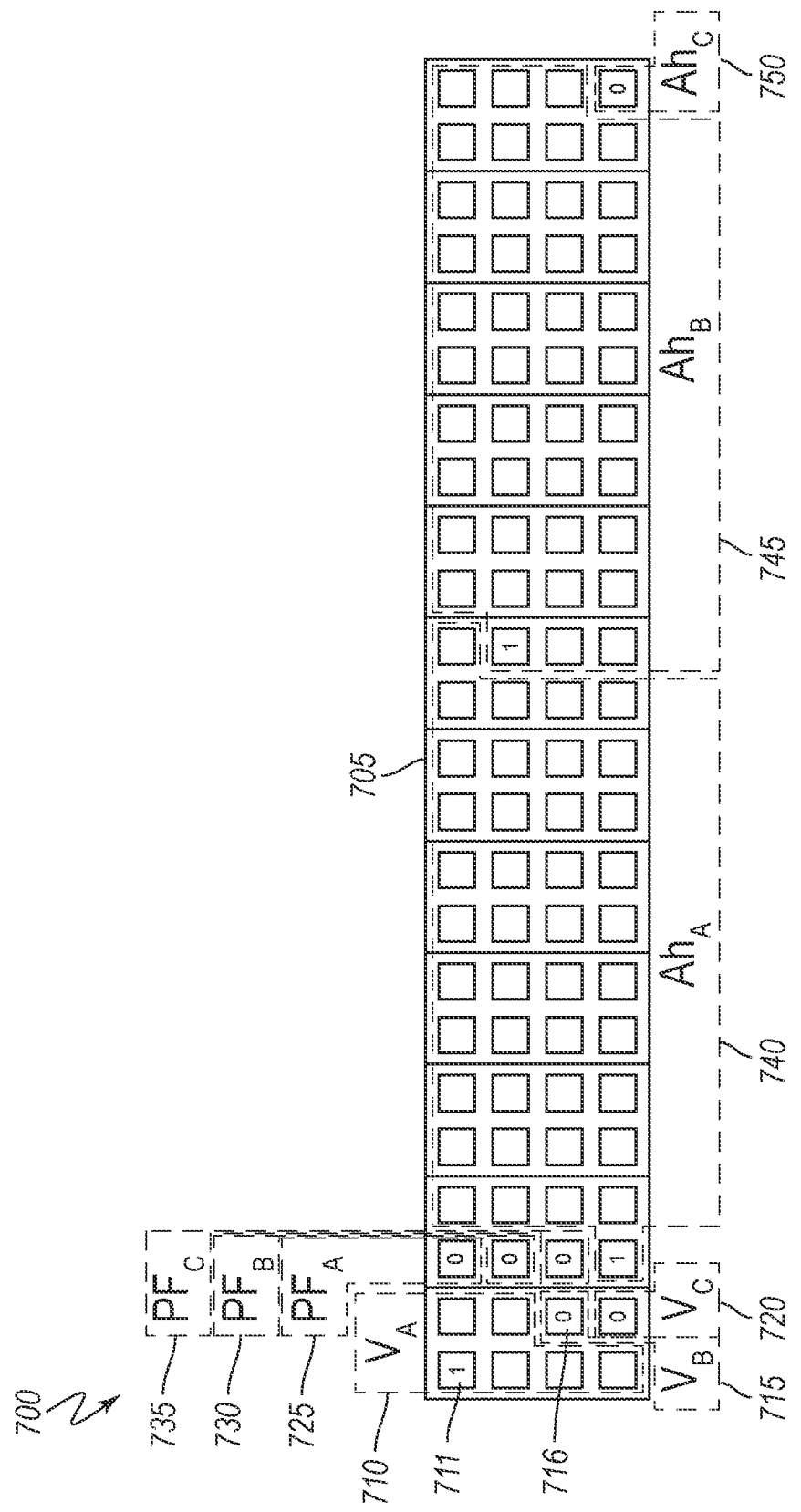
FIG. 7 illustrates a 12-byte payload region of a transmission package compiled by an ACDTS, according to an embodiment of the present disclosure.

FIG. 7 illustrates a 12-byte payload region 705 of a transmission package compiled by an ACDTS 700, according to an embodiment of the present disclosure. The ACDTS 700 may be similar in some respects to the ACDTS 100 of FIG. 1. The ACDTS 700 may be the similar to the ACDTS 600 of FIG. 6A. The ACDTS 700 and the ACDTS 600 of FIG. 6A may be the same ACDTS shown at different data generations or acquisitions. The payload region 705 includes a $V_A$ data field 710 with a non-collapse flag bit 711. A flag bit 716 is set to "0" to indicate the $V_B$ data field 715 is collapsed. The $V_C$ data field 720 is likewise collapsed. The $V_B$ and $V_C$ data fields 715, 720 may be collapsed for one or more reasons, such as, e.g., the data values match, or fall within a particular range of the data value for the $V_A$ data field 710, or the data values for the current generation or acquisition fall within a particular range of the data values for a last prior communication of these data fields 715, 716 to a gateway device (see the gateway device 170 in FIG. 1). Stated otherwise, the reading of the data was valid but unchanged from a prior reading, and therefore does not need to be sent and thus the data fields are collapsed. The collapse flag bit could alternatively or also indicate "unchanged" to communicate that the data is unchanged from a prior reading. The $PF_A$, $PF_B$, and $PF_C$ data fields 725, 730, 735 are also collapsed. These data fields 725-735 may be collapsed for one or more reasons, such as, e.g., the current data values fall within a particular range of the data values last communicated for these data fields 725-735, or a time interval priority amendment collapses these data fields 725-735 for the current iteration of data generation and communication, etc. In the example of FIG. 7, the AhA and AhB data fields 740, 745 are not-collapsed and the respective data values are included for communication. There is not enough room in the payload region 705 to include the data value for the $Ah_C$ data field 750, so the $Ah_C$ data field 750 is collapsed. Any other data fields have a lower priority and are automatically collapsed.

Figure 8:
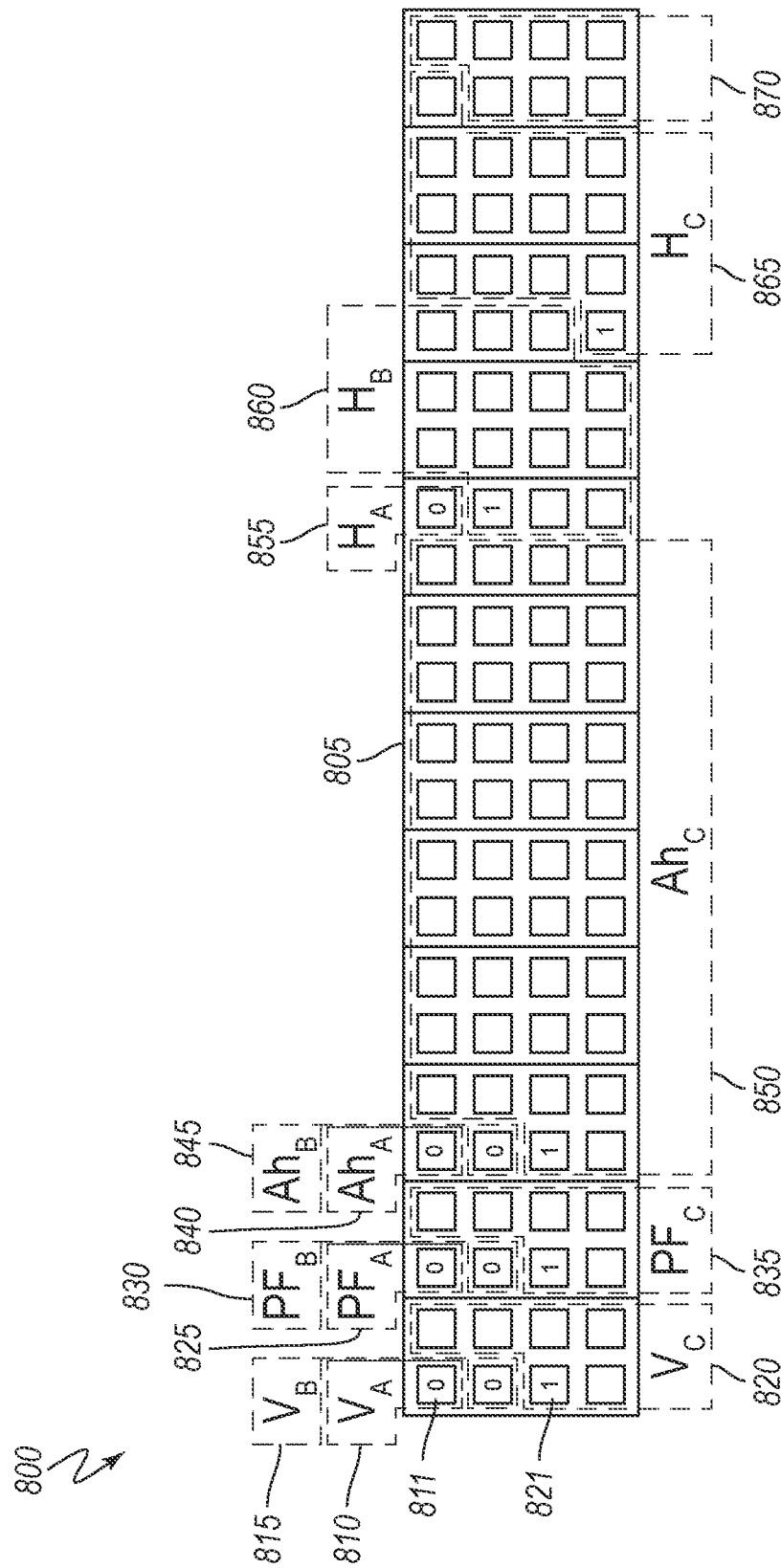
FIG. 8 illustrates a 12-byte payload region of a transmission package compiled by an ACDTS, according to an embodiment of the present disclosure.

FIG. 8 illustrates a payload region 805 of a transmission package compiled by an ACDTS 800, according to an embodiment of the present disclosure. As with FIG. 7, the ACDTS 800 is similar in some respects to the ACDTS 100 of FIG. 1, and is similar to, or may be the same ACDTS 600, 700 of FIG. 6, 7. In the example of FIG. 8, a flag bit 811 is set to "0" to indicate the $V_A$ data field 810 is collapsed. The $V_B$ data field 815 is similarly collapsed. A flag bit 821 for the $V_C$ data field 820 is set to "1" to indicate the $V_C$ data field 820 is not collapsed, and the data value for the $V_C$ data field 820 is included in the payload region 805. The ACDTS 800 may have collapsed the $V_A$ and $V_B$ data fields for one or more reasons, such as, e.g., the current data values fall within a particular range of the last reported data values for these data fields 810, 815, or the ACDTS 800 may iterate through each of $V_A$, $V_B$, and $V_C$ data fields 810-820, reporting them sequentially in sequential transmission packages provided priority adjustment results in an elevation (or non-collapse) of one of the otherwise collapsed data fields 810-820, etc. The $PF_A$, $PF_B$, $Ah_A$, $Ah_B$, and $H_A$ 825, 830, 840, 845, 855 are also collapsed (for one or more reasons) and collapsed. The $Ah_C$, $H_B$, and $H_C$ data fields 850, 860, 865 are not collapsed and the respective data values are included in the payload region 805. In the example of FIG. 8, no data field in the collection of data fields has a lower priority than that of the $H_C$ data field 865, thus the payload 805 may include one or more non-significant bits 870 which are ignored as not representing any measurement of any performance or characteristic of the monitored system (see the monitored system 60 in FIG. 1).

Figure 9:
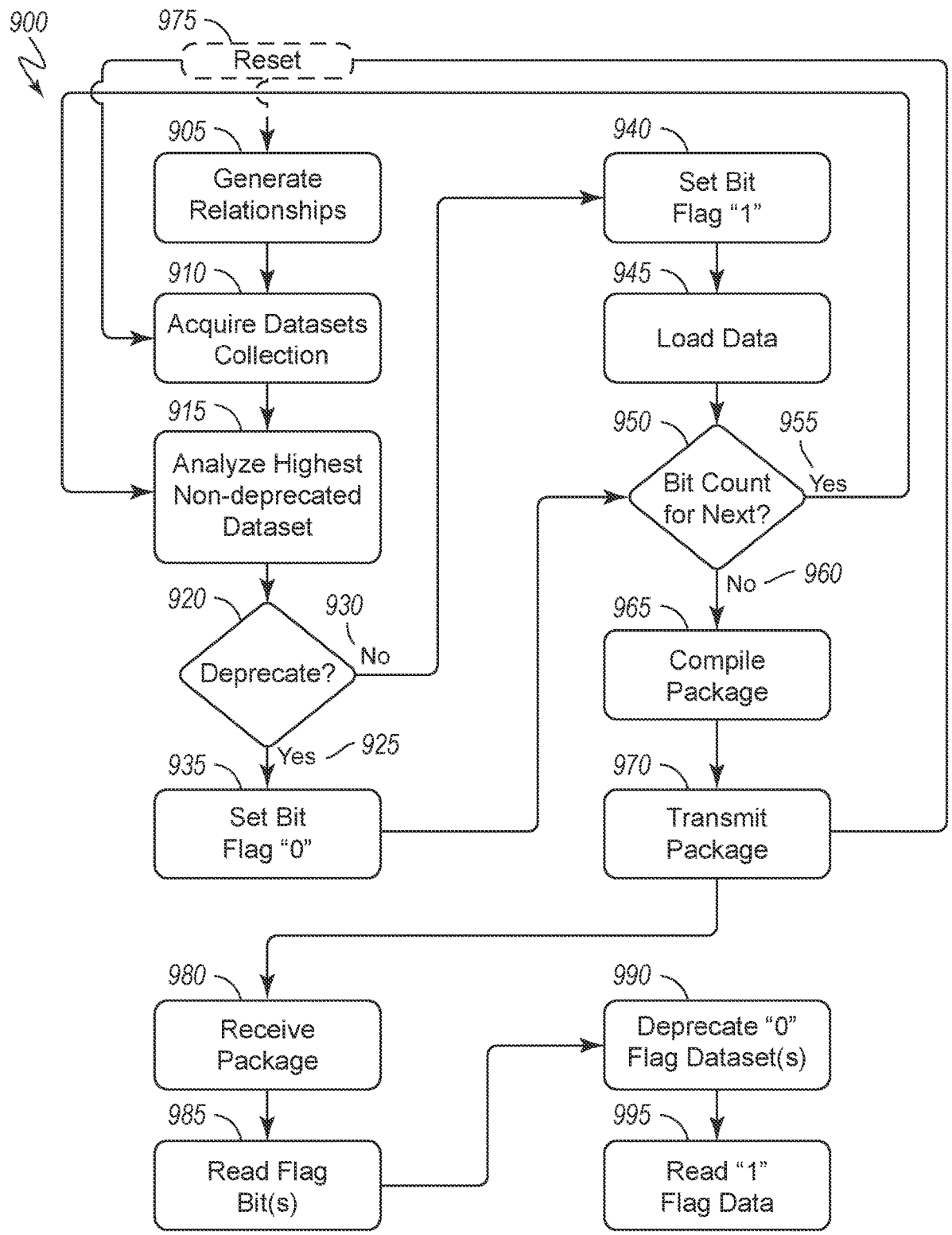
FIG. 9 is a method for an ACDTS, such as the ACDTSs of FIGS. 1, 5-8, according to an embodiment of the present disclosure.

FIG. 9 is a method 900 for an ACDTS, such as the ACDTSs 100, 500, 600, 700, 800 of, respectively, FIGS. 1, 5-8, according to an embodiment of the present disclosure. The method 900 first generates 905 relationships for each data field of a collection of data fields, each date field related to a data value representing a measurement of a performance of a characteristic of a monitored system. Said otherwise, each data field is a container to receive a data value that reflects a measurement of a performance or characteristic of the monitored system to which the data field is associated. The relationships between the data fields represent a priority of each data field within the collection of data fields. At least one data field has the highest priority. At least one data field has a priority below that of the highest priority. The hierarchy of priorities may be stored in a database table, array, or other electronic format to permit applying the priorities to the data fields. The priorities initially established constitute a baseline priority of each data field. The hierarchy of priorities further comprises rules, parameters, etc. (configurable conditions) which are combined with the baseline priorities to generate a priority configuration for an instance of data values generated or acquired at the monitored system. The baseline priority of each data field may be collapsed based on one or more configurable conditions.

A set of data values corresponding to the data fields is acquired 910. The data field having the highest baseline priority is analyzed 915, whereby the current data value for the data field is processed with each relevant configurable condition to determine if the data field is to be collapsed 920. If "no" 930 a flag bit for the current field is set 940 to 1 to indicate the not-collapsed state of the current data field. (In another embodiment, a 0 may be used to indicate the not-collapsed state.) The flag bit and associated data value are loaded 945. Loading 945 the flag bit and data value constructively results in the flag bit and data value being inserted into a payload region of a transmission package. If "yes" 925, a flag bit corresponding to the data field (which may be the first bit of the data field) is set 935 to "0." After the flag bit is set 935 to "0," or after the data value is loaded 945, a remaining bit count determines 950 if there is room in the payload region for the next highest priority data field. The payload region may be capable of including multiple data fields. If "yes" 955, the next highest baseline priority data field is similarly analyzed 915. If "no" 960, the transmission is compiled 965, whereby the payload region is assembled in order of highest to lowest priority, regardless of whether each data field is represented by a collapse flag bit or by a non-collapse flag bit and the associated data value, and any other data or formatting is prepended and/or appended to the transmission package. The present disclosure anticipates that a transmission package may comprise a payload region wherein the first bit and the second bit are each set to indicate an absence of a first precedence datatype and a second datatype as designated by the hierarchical relationships of the collection of datatypes. A transmission package may be configured to comprise a plurality of status subfields to indicate exclusion of a data of a plurality of data fields. Each status subfield set to indicate exclusion of a data field is followed immediately by a status subfield. Similarly, a transmission package may be configured to comprise a plurality of status subfields set to indicate inclusion of data of a plurality of data fields, and each status subfield set to indicate inclusion of data of a data field is followed immediately by the data field corresponding to the given status subfield. Once the transmission package is ready, the transmission package is transmitted 970 to a gateway device. After a transmission package is sent, the system resets 975 to the baseline priorities for a next generation or acquisition of data values. In some instances, the reset 975 may invoke a new generation 905 of relationships. The hierarchical relationships may be regenerated base on a lapse of time, a completions of a series of measurements, a completion of a series of transmissions, a signal from the receiver (e.g., a gateway device), a signal from a controller, an event at the electrical system, etc. The transmission package is received 980 at a receiver, such as, e.g., a gateway device. The gateway device (or other receiver) extracts the selected datatype from the transmission package. The gateway device (or other receiver) has, at memory, a table of hierarchical relationships matching the hierarchical relationships generated for datatype of the collection datatypes. It should be noted that the baseline hierarchical relationships and configurable conditions may be generated and/or augmented at the remote node, at a supervising node, at the gateway, or at another computing device. The gateway device (or other receiver) sequentially reads each bit of the payload region of the transmission package. The gateway device (or other receiver) is configured to identify a flag bit of the payload region set to indicate the presence of the selected datatype in the bits immediately following the flag bit. The gateway device (or an upstream computing system) reads 985 the first bit of the payload region to acquire the flag bit. If the flag bit indicates collapse or deprecation 990 of the data field, the gateway device reads the next bit as a flag bit related to the next data field. If the flag bit indicates non-collapse or non-deprecation 995 of the data field, the gateway device reads the appropriate number of sequential bits to acquire the data value corresponding to the data field. In other words, the gateway device (or other receiver) reads the selected datatype from the payload region. The selected datatype may be processed according to the measurement of performance reported by the selected datatype according to methods, procedures, etc., at the gateway device. The gateway device (or an upstream computing system) iteratively reads each flag bit to identify each sequential collapsed data field and each sequential non-collapsed data field along with its associated data value. The use of flag bits to collapse data fields that are not included in the current payload region permits transmission of more net data in a series of data generation and transmission evolutions than would be otherwise possible. The collapse bit allows a collapsed data field to be collapsed, making all (or all but one bit) of the collapsed data field to be used for a different data field.

EXAMPLES

Some examples of embodiments of the present disclosure are provided below.

Example 1. A method to electrically transmit data, comprising: generating a hierarchical relationship for each datatype of a collection of datatypes to at least one other datatype of the collection of datatypes, the hierarchical relationship based on a precedence of each datatype of the collection of datatypes, wherein the precedence of a given datatype is adjustable based on a configurable condition and one datatype has a highest precedence relative to other datatypes of the collection of datatypes; periodically acquiring or receiving data for the collection of datatypes corresponding to the hierarchical relationship, wherein each datatype reflects or represents a measurement of performance and/or a characteristic of an electrical system; selecting, from the collection of datatypes, a datatype that is currently appropriate for reporting to a receiver based on the hierarchical relationships and the configurable condition; formatting a transmission package comprising a data payload region, wherein a first bit of the payload region serves as a flag bit to indicate one of a presence and absence of the highest precedence datatype in the immediately subsequent bits of the payload region, a succeeding bit of the payload region serves as a flag bit to indicate presence of a next highest precedence datatype in bits immediately subsequent to the succeeding bit, the selected datatype is included in bits of the payload region immediately subsequent to the succeeding bit, and transmitting the transmission package to the receiver.

Example 2. The method of example 1, wherein formatting the transmission package further comprises imposing a transmission size constraint that preclude the transmission package containing all datatype of the collection of datatypes.

Example 3. The method of example 1, wherein the configurable condition is a degree of change between the measurement of performance reflected or represented by a current datatype and a measurement of performance reflected or represented by a previous instance of the current datatype in a prior collection of datatypes.

Example 4. The method of example 1, wherein the configurable condition is a recency of transmission of at least one of a prior datatype reflecting or representing a measurement of the same performance and a prior datatype reflecting or representing another measurement of performance.

Example 5. The method of example 1, wherein the configurable condition relates to an event at the electrical system.

Example 6. The method of example 1, wherein the configurable condition relates to a time-based schedule.

Example 7. The method example 1, wherein the payload region is capable of including multiple datatypes of the collection of datatypes.

Example 8. The method of example 1, wherein the first bit and the second bit are each set to indicate an absence of a first precedence datatype and a second precedence datatype at designated by hierarchical relationships of the collection of datatypes.

Example 9. The method of example 1, further comprising receiving the transmission package at the receiver.

Example 10. The method of example 1, further comprising extracting the selected datatype from the transmission package.

Example 11. The method of example 1, wherein the receiver comprises a table of hierarchical relationships matching the hierarchical relationships generated for each datatype of the collection of datatypes.

Example 12. The method of example 11, wherein the receiver sequentially reads each bit of the payload region of the transmission package.

Example 13. The method of example 12, wherein the receiver identifies a flag bit of the payload region set to indicate the presence of the selected datatype in the bits immediately following the flag bit.

Example 14. The method of example 13, wherein the receiver reads the selected datatype from the payload region and further processes the selected datatype according to the measurement of performance reported by the selected datatype.

Example 15. The method of claim 1, wherein the hierarchical relationships are regenerated based on one of a lapse of time, a completion of a series of measurements, a completion of a series of transmissions, a signal from the receiver, a signal from a controller, and an event at the electrical system.

Example 16. A system to electronically transmit data, comprising: a communication network interface; a memory to store a prioritization or hierarchical relationship of data fields of a plurality of data fields to be included within a dataset; one or more processors to: receive a current dataset including data for the plurality of data fields, wherein data for each data field reflects or represents a measure of performance or a characteristic of an electrical system; generate a transmission package by: determining, for each given data field of the plurality of data fields in sequential order or sequence according to the prioritization, whether the data of the given data field is appropriate for reporting to a receiver or otherwise to be included in the transmission package, based on a configurable condition; if the data of the given data field is to be included in the transmission package, setting a status subfield (e.g., a bit) to indicate inclusion of the data of the given data field and adding the status subfield and the data of the given data field in the transmission package; and if the data of the given data field is to be excluded or omitted from the transmission package, setting the status subfield (e.g., a bit) to indicate exclusion of omission of the data of the given data field and adding only the status subfield in the transmission package and thereby omitting the data and the remaining portion of the given data field; and transmit the transmission package to a receiver via the communication network interface.

Example 17. The system of example 16, wherein prioritization of data fields comprises a change of value of a given data field from a value of the given data field of an earlier transmission.

Example 18. The system of example 16, wherein the prioritization of data fields comprises at least one of recency of inclusion of a given data field in a transmission, an event, and a time-based schedule.

Example 19. The system of example 16, wherein the transmission package is configured to comprise a plurality of status subfields to indicate exclusion of data of a plurality of data fields.

Example 20. The system of example 19, wherein each status subfield of the plurality of status subfields to indicate exclusion of data of the plurality of data fields is followed immediately by a status subfield.

Example 21. The system of example 16, wherein the transmission package is configured to comprise a plurality of status subfields to indicate inclusion of data of a plurality of data fields.

Example 22. The system of example 21, wherein each status subfield of the plurality of status subfields to indicate inclusion of data of the plurality of data fields is followed immediately by the data field corresponding to the given status subfield.

Example 23. A method of electronically transmitting data, comprising: creating a prioritization or a hierarchy of data fields within a plurality of data fields to be included within a dataset or periodically received datasets, wherein each data field includes a status subfield (e.g., a bit), wherein data for each data field reflects or represents a measurement of performance or a characteristic of an electrical system; receiving a current dataset including data for the plurality of data fields; generating a transmission package that comprises a payload region that includes one or more data fields of the plurality of data fields and corresponding data from the dataset, the generating including, for each given data field of the plurality of data fields in sequential order or sequence according to the prioritization: determining whether the data of the given data field is appropriate for reporting to a receiver or otherwise to be included in the transmission package, based on a configurable condition; if the data of the given data field is to be included in the transmission package, setting a status subfield (e.g., a bit) to indicate inclusion of the data of the given data field and adding the status subfield and the data of the given data field in the transmission package; and if the data of the given data field is to be excluded or omitted from the transmission package, setting the status subfield (e.g., a bit) to indicate exclusion or omission of the data of the given data field and adding only the status subfield in the transmission package and thereby omitting the data and the remaining portion of the given data field; and transmitting the transmission package to the receiver.

Example 24. The method of example 23, wherein a single bit of each data field of the plurality of data fields serves as the status subfield to indicate inclusion or exclusion of the data of the data field.

Example 25. The method of example 23, wherein a status subfield indicating inclusion is followed by the data of the given data field in the immediately subsequent bits of the transmission package, and wherein a status subfield indicating exclusion is followed by another status subfield at the immediately subsequent bit (or bits) of the transmission package.

Example 26. A method of electronically transmitting data, comprising: receiving a current dataset including data for a plurality of data fields each representing a measurement of performance or a characteristic of an electrical system; generating a transmission package that comprises a payload region that includes data for the current dataset corresponding to one or more data fields of the plurality of data fields, the generating including, for each given data field of the plurality of data fields in sequential order or sequence according to prioritization: determining whether the data of the given data field is appropriate for reporting to a receiver or otherwise to be included in the transmission package, based on a configurable condition; if the data of the given data field is to be included in the transmission package, setting a status subfield (e.g., a bit) to indicate inclusion of the data of the given data field and adding the status subfield and the data of the given data field in the transmission package; and if the data of the given data field is to be excluded or omitted from the transmission package, setting the status subfield (e.g., a bit) to indicate exclusion or omission of the data of the given data field and adding only the status subfield in the transmission package and thereby omitting the data and the remaining portion of the given data field; and transmitting the transmission package to the receiver.

Example 27. A protocol to transmit data, comprising: for each data field of a plurality of data fields, and in a sequential order or sequence according to a prioritization: determining, based on a configurable condition, whether data corresponding to the data field is appropriate for reporting to a receiver or otherwise to be included in a transmission package; if the data corresponding to the data field is to be included in the transmission package, setting a status subfield (e.g., a status flag; a status bit) to indicate inclusion of the data of the given data field and including the status subfield and the data of the data field in the transmission package; and if the data of the data field is to be excluded or omitted from the transmission package, setting the status subfield (e.g., a status flag; a status bit) to indicate exclusion or omission of the data of the data field and adding only the status subfield in the transmission package and thereby omitting the data and the remaining portion of the given data field; and transmitting the package.

It will be obvious to those having skill in the art that many changes may be made to the details of the above-described embodiments without departing from the underlying principles of the invention. The scope of the present invention should, therefore, be determined only by the following claims.

What is claimed is:

1. A method to electrically transmit data, comprising:
generating a hierarchical relationship for each datatype of a collection of datatypes to at least one other datatype of the collection of datatypes, the hierarchical relationship based on a given precedence of each datatype of the collection of datatypes, wherein the precedence of a given datatype is adjustable based on a configurable condition and one datatype has a highest precedence relative to other datatypes of the collection of datatypes;
periodically acquiring data for the collection of datatypes corresponding to the hierarchical relationships, wherein each datatype reflects a measurement of performance of an electrical system;
selecting, from the collection of datatypes, a datatype that is currently appropriate for reporting to a receiver based on the hierarchical relationship and the configurable condition; formatting a transmission package comprising a data payload region, wherein
a first bit of the payload region serves as a flag bit to indicate one of presence and absence of the highest precedence datatype in the immediately subsequent bits of the payload region, and
a succeeding bit of the payload region serves as a flag bit to indicate presence of a next highest precedence datatype in bits immediately subsequent to the succeeding bit,
the selected datatype is included in bits of the payload region immediately subsequent to the succeeding bit; and
transmitting the transmission package to the receiver.

2. The method of claim 1, wherein formatting the transmission package further comprises imposing a transmission size constraint that precludes the transmission package containing all datatypes of the collection of datatypes.

3. The method of claim 1, wherein the configurable condition is a degree of change between the measurement of performance reflected by a current datatype and measurement of performance reflected by a previous instance of the current datatype included in a prior collection of datatypes.

4. The method of claim 1, wherein the configurable condition is a recency of transmission of at least one of a prior datatype representing a measurement of the same performance and a prior datatype representing another measurement of performance.

5. The method of claim 1, wherein the configurable condition relates to an event at the electrical system.

6. The method of claim 1, wherein the configurable condition relates to a time-base schedule.

7. The method of claim 1, wherein the payload region is capable of including multiple datatypes of the collection of datatypes.

8. The method of claim 1, wherein the first bit and a second bit are each set to indicate an absence of a first precedence datatype and a second precedence datatype as designated by the hierarchical relationships of the collection of datatypes.

9. The method of claim 1, wherein the receiver comprises a table of hierarchical relationships matching the hierarchical relationship generated for each datatype of the collection of datatypes.

10. The method of claim 9, wherein the receiver sequentially reads each bit of the payload region of the transmission package.

11. The method of claim 10, wherein the receiver identifies a flag bit of the payload region set to indicate the presence of the selected datatype in the bits immediately following the flag bit.

12. The method of claim 11, wherein the receiver reads the selected datatype from the payload region and further process the selected datatype according to the measurement of performance reported the selected datatype.

13. The method of claim 1, wherein the hierarchical relationships are regenerated based on one of a lapse of time, a completion of a series of measurements, a completion of a series of transmissions, a signal from the receiver, a signal from a controller, and an event at the electrical system.

14. A system to electronically transmit data, comprising:
a communication network interface;
a memory to store a prioritization of data fields of a plurality of data fields to be included within a dataset;
one or more processors to:
  receive a current dataset including data for the plurality of data fields, wherein data for each data field reflects a measurement of performance of an electrical system;
  generate a transmission package by:
    determining, for each given data field of the plurality of data fields in sequential order according to the prioritization, whether the data of the given data field is to be included in the transmission package, based on a configurable condition;
    if the data of the given data field is to be included in the transmission package, setting a status subfield to indicate inclusion of the data of the given data field and adding the status subfield and the data of the given data field in the transmission package; and
    if the data of the given data field is to be excluded from the transmission package, setting the status subfield to indicate exclusion of the data of the given data field and adding only the status subfield in the transmission package and thereby omitting the data of the given data field; and
  transmit the transmission package to a receiver via the communication network interface.

15. The system of claim 14, wherein prioritization of data fields comprises a change of value a given data field from a value of the given data field of an earlier transmission.

16. The system of claim 14, wherein the prioritization of the data fields comprises at least one of a recency of inclusion of a given data field in a transmission, an event, and a time-base schedule.

17. The system of claim 14, wherein the transmission package is configured to comprise a plurality status subfields to indicate exclusion of data of a plurality of data fields.

18. The system of claim 17, wherein each status subfield of the plurality of status subfields to indicate exclusion of data of the plurality of data fields is followed immediately by a status subfield.

19. The system of claim 14, wherein the transmission package is configured to comprise a plurality status subfields to indicate inclusion of data of a plurality of data fields.

20. The system of claim 19, wherein each status subfield of the plurality of status subfields to indicate inclusion of data of the plurality of data fields is followed immediately by the data field corresponding to the given status subfield.

* * * * *